(12) United States Patent
Shin

(10) Patent No.: US 6,558,049 B1
(45) Date of Patent: May 6, 2003

(54) SYSTEM FOR PROCESSING VIDEO IN COMPUTING DEVICES THAT MULTIPLEXES MULTIPLE VIDEO STREAMS INTO A SINGLE VIDEO STREAM WHICH IS INPUT TO A GRAPHICS CONTROLLER

(75) Inventor: Seong Shin, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/662,584

(22) Filed: Jun. 13, 1996

(51) Int. Cl.[7] ............................................... G06F 13/00
(52) U.S. Cl. ...................... 395/850; 395/872; 345/113; 345/435
(58) Field of Search ................................. 395/821, 872, 395/883, 850; 345/132, 330, 339, 133; 348/15, 552, 564, 565

(56) References Cited

U.S. PATENT DOCUMENTS

| | | | | |
|---|---|---|---|---|
| 5,040,067 A | * | 8/1991 | Yamazaki | 358/183 |
| 5,166,779 A | * | 11/1992 | Moyer | 358/10 |
| 5,229,855 A | * | 7/1993 | Siann | 358/183 |
| 5,402,148 A | * | 3/1995 | Post et al. | 345/132 |
| 5,543,842 A | * | 8/1996 | Xu et al. | 348/387 |
| 5,630,174 A | * | 5/1997 | Stone, III et al. | 395/883 |
| 5,642,139 A | * | 6/1997 | Eglit et al. | 345/202 |
| 5,642,498 A | * | 6/1997 | Kutner | 395/509 |
| 5,650,955 A | * | 7/1997 | Puar et al. | 365/51 |
| 5,657,096 A | * | 8/1997 | Lukacs | 348/585 |
| 5,680,123 A | * | 10/1997 | Lee | 340/937 |
| 5,696,912 A | * | 12/1997 | Bicevskis et al. | 395/308 |
| 5,731,799 A | * | 3/1998 | Kee et al. | 345/113 |
| 5,752,010 A | * | 5/1998 | Herbert | 395/509 |
| 5,801,785 A | * | 9/1998 | Crump et al. | 348/563 |

* cited by examiner

Primary Examiner—Thomas C. Lee
Assistant Examiner—Albert Wang
(74) Attorney, Agent, or Firm—Ronald O. Neerings; Richard L. Donaldson

(57) ABSTRACT

This is a system and method of processing multiple video streams for a computing device. The system may comprise: a central processing device; a communications bus connected to the central processing device; an input device connected to the central processing device by the communications bus; an output device connected to the central processing device by the communications bus; a multiple video stream processor connected to the output device by the communications bus; and at least two video streams connected to the multiple video stream processor. In addition, the video streams may include input from a CD-ROM, PCMCIA cards, storage devices, peripherals on docking stations and other communications devices. Moreover, multiple video processing device may include input from zoom video ports, buffers and digital-to-analog converters, and a reformatting device. Other devices and systems are also disclosed.

16 Claims, 8 Drawing Sheets

SYSTEM FOR PROCESSING VIDEO IN COMPUTING DEVICES THAT MULTIPLEXES MULTIPLE VIDEO STREAMS INTO A SINGLE VIDEO STREAM WHICH IS INPUT TO A GRAPHICS CONTROLLER

FIELD OF THE INVENTION

This invention generally relates to computing devices with multiple video inputs.

BACKGROUND OF THE INVENTION

A common use for computers is to display videos from a CD-ROM, hard disk drive or other video stream. Currently, this can be implemented by feeding the video stream directly into the graphic display controller or going into a decoder usually in a peripheral device or a chip set on the motherboard. The video stream could also come from an analog input line. However, the video stream could come along any communications path such as the data bus coming off the modem, the local area network or any other means that the computer gets input from. Yet, although the computer can receive several video streams, the graphics display controller can only receive the video streams one at a time through its video port; therefore, a mechanism is needed to buffer each video stream and alternate between them so that the video display will receive only one at a time.

SUMMARY OF THE INVENTION

This is a system and method of receiving multiple video streams into a computing device. The system and method convert those multiple video steams into one video stream so that the graphics display controller sees only one stream. The present invention would work with a standard graphics display controller without modification. In addition, the system and method of the present invention would also save valuable microprocessor time because the system processes the video streams, not the microprocessor. Moreover, the system would lessen the traffic on the communications busses because of the elimination of the microprocessor in the buffering scheme. This multi-video stream controller would include a means to accept multiple video streams at one time; a means to convert multiple video streams to one single video stream and a connection to the graphics display controller.

This is a system and method of processing multiple video streams for a computing device. The system may comprise: a central processing device; a communications bus connected to the central processing device; an input device connected to the central processing device by the communications bus; an output device connected to the central processing device by the communications bus; a multiple video stream processor connected to the output device by the communications bus; and at least two video streams connected to the multiple video stream processor.

In addition, the video streams may include input from a CD-ROM, PCMCIA cards, storage devices, peripherals on docking stations and other communications devices. Moreover, multiple video processing device may include input from zoom video ports, buffers and digital-to-analog converters, and a reformatting device. Other devices and systems are also disclosed.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

FIGS. 1–4 illustrate a portable personnel computer which the present invention could be implemented on. FIGS. 5–9 illustrate details of the present invention.

Figure 1:
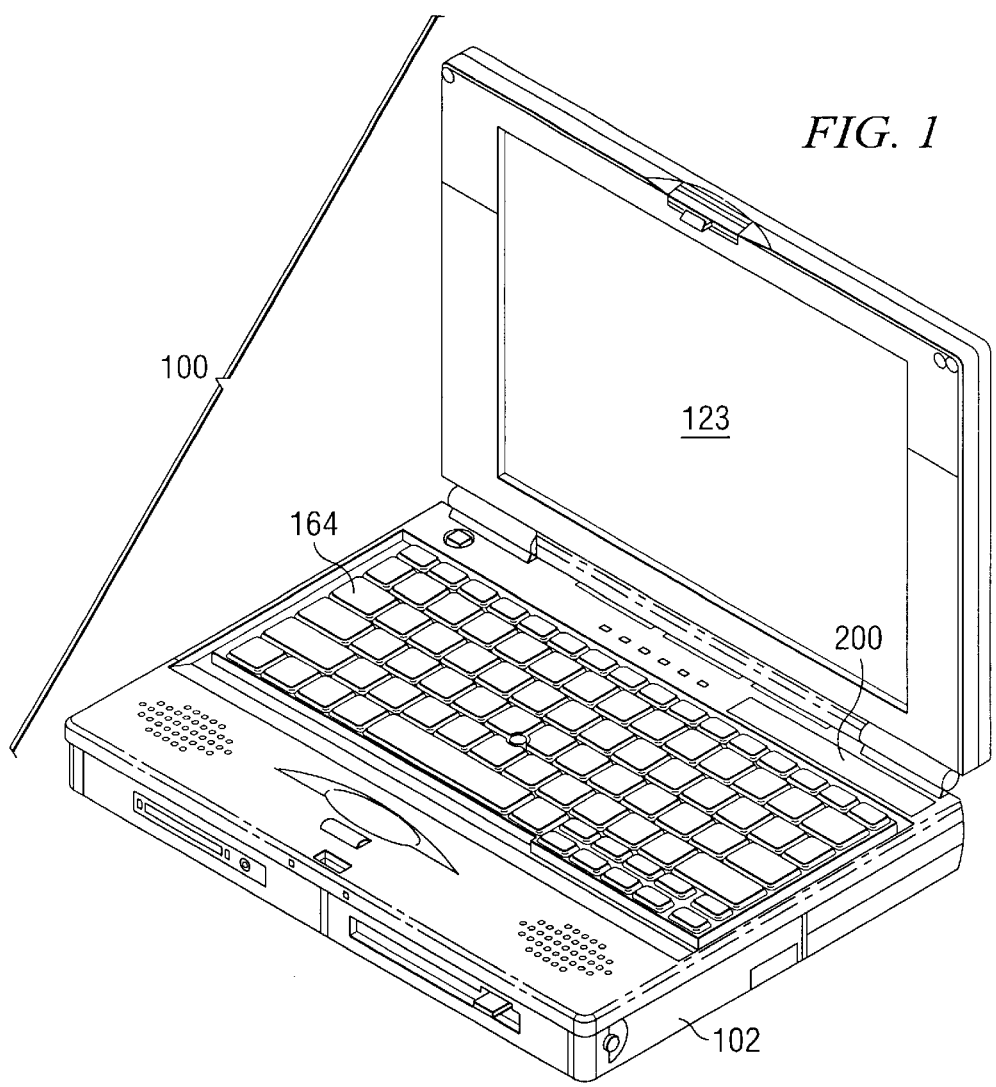
FIG. 1 is an isometric view of a portable computer.

FIG. 1 illustrates a portable personal computer 100 having a primary display 123, an alternate display 200, a base unit 102 and a keyboard 164. The present invention is ideally suited for the portable computer 100. The alternate display could include a clear window made of plastic or glass directly above the PCMCIA cards. In addition, the display could include a sliding privacy window, to close the clear window for privacy purposes. However, the alternate display could include an opaque window that slides back to leave an opening to see the PCMCIA card display. Moreover, one possible configuration for the alternate display would display messages in one or two lines, and scroll as needed. However, although FIG. 1 illustrates one embodiment, other embodiments will be discussed later.

Figure 2:
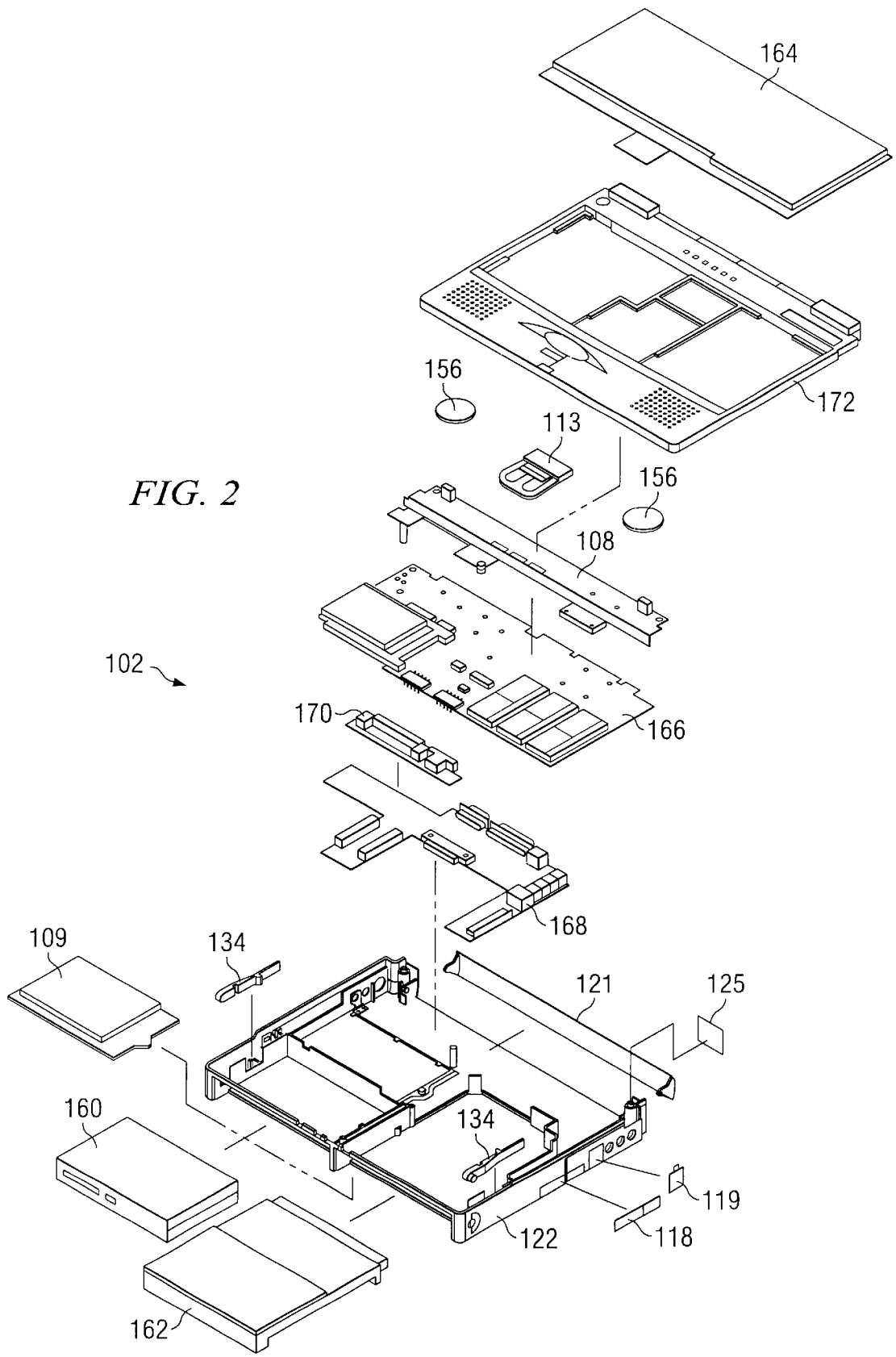
FIG. 2 is an exploded view of the base of the portable computer of FIG. 1.

FIG. 2 illustrates an exploded view of the base unit 102 of FIG. 1. Keyboard 164 is attached to top cover 172. The speaker assemblies 156 and the pick button assembly 113 both attach to the top cover 172. Moreover, the top printed wiring board 166 and the bottom printed wiring board 168 are attached to the heatplate and printed wiring board assembly 108. The bus/VGA printed wiring board 170 also attaches to the bottom printed wiring board 168. The assembly 108 and printed wiring boards 168, 170 and 166 fit into the base assembly 122.

The base assembly 122 has a connector door 121 that exposes the connectors for the user's access. The connector door 121 is operated by the door release button 125. The base assembly 122 also has a modem door 118, hard drive assembly 109 and media release latches 134. The media release latches 134 release and secure the battery pack 160 and media bay 162.

Figure 3:
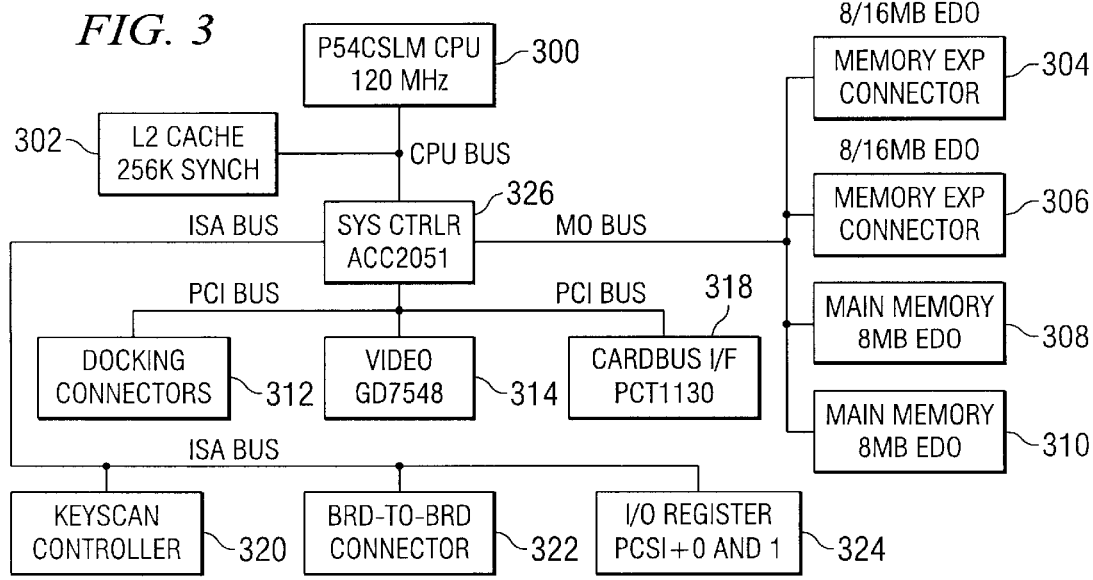
FIG. 3 is a block diagram of the electronic architecture of the portable computer of FIG. 1.

FIG. 3 is a block diagram of the top printed wiring board 166 of portable computer 100 (shown in FIG. 2). Portable computer 100 is a color portable notebook computer based upon the Intel™ Pentium™ microprocessor 300. Operating speed of the Pentium™ is 120 Mhz internal to the processor, but with a 60 Mhz external bus speed. A 60 Mhz oscillator is supplied to the ACC Microelectronics 2056 core logic chip (not shown in FIG. 3) which in turn uses this to supply the microprocessor. This 60 Mhz CPU clock is multiplied by a phase locked loop internal to the processor to achieve the 120 Mhz CPU speed. The processor 300 contains 16 KB of internal cache and 256 KB of external cache 302 on the logic board.

The 60 Mhz bus of the CPU is connected to a VL to PCI bridge chip 326 from ACC microelectronics to generate the PCI bus, the ISA bus and the MD bus. The bridge chip takes a 33.333 Mhz oscillator to make the PCI bus clock. The primary video controller 314 and an alternate video controller (not shown) are driven from the PCI bus. In addition, both, a docking options connector 312 and a cardbus I/F 318 are connected to the PCI bus. The cardbus I/F 318 connects a PCMCIA card system which allows two PCMCIA cards to be connected to the PCI bus. These slots may be used with third party boards to provide various expansion options.

The primary video controller 314 has a 14.318 Mhz oscillator input which it uses internally to synthesize the higher video frequencies necessary to drive an internal 10.4" TFT panel or external CRT monitors. When running in VGA or Super VGA resolution modes, the TFT panel may be operated at the same time as the external analog monitor. For XVGA resolutions only the external CRT may be used. In addition, the PCMCIA card system has a zoom video connection to the primary video controller.

Portable computer 100 contains 16 Megabytes of standard memory 308, 310 which may be increased by the user up to 48 Megabytes by installing optional expansion memory boards 304, 306. The first memory expansion board can be obtained with either 8 or 16 Megabytes of memory. With the first expansion board installed, another 8 or 16 Megabytes of memory may be attached to make the maximum amount.

Operation input to portable computer 100 is made through the keyboard and an internal pointing device imbedded in the keyboard. Both types of input feed into the keyscan controller 320 which is connected by the ISA bus. In addition, I/O register 324 is connected through the ISA bus. Moreover, a board-to-board connector 322 connects the top printed wiring board to the bottom printed wiring board.

Figure 4:
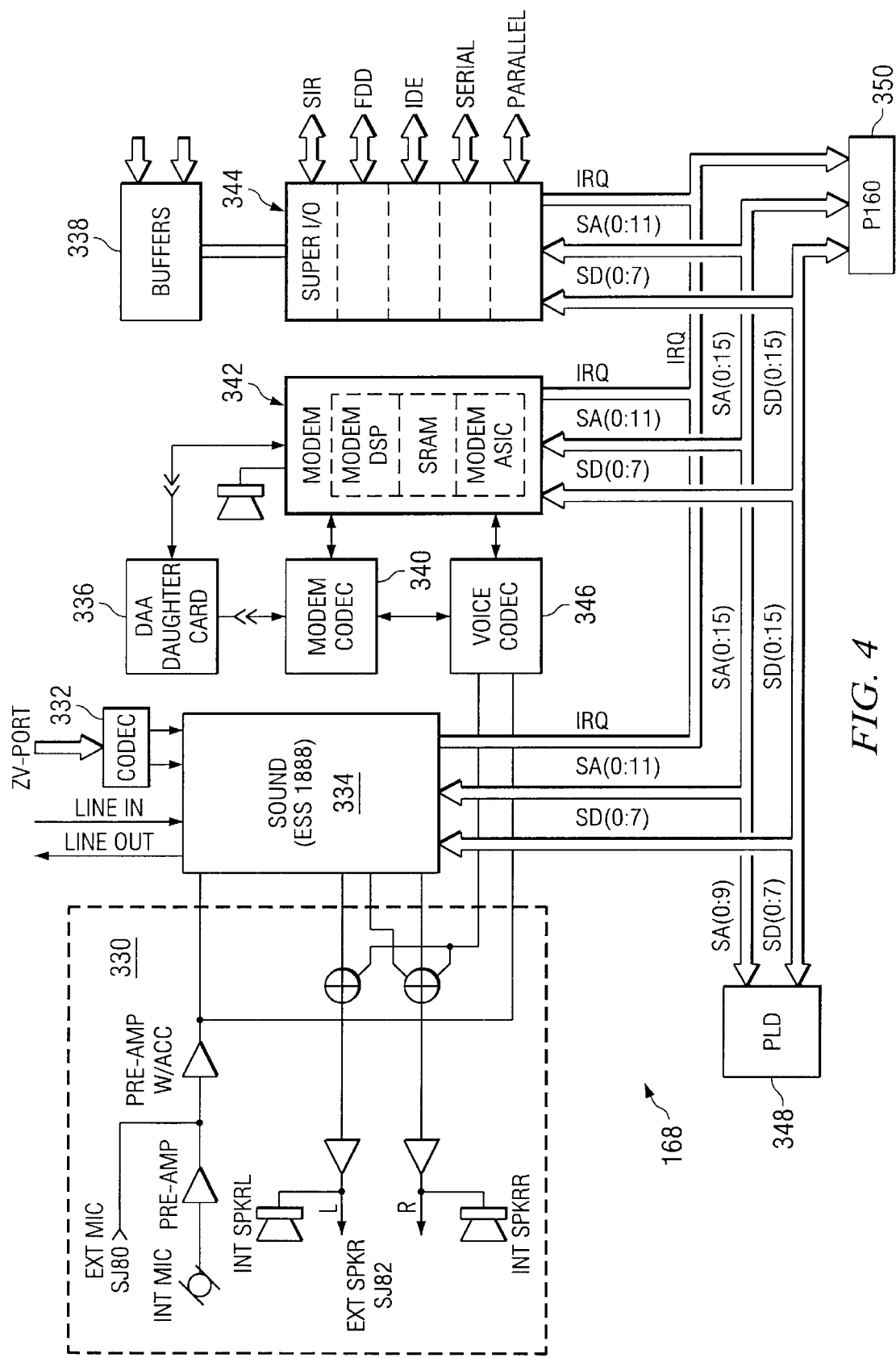
FIG. 4 is another block diagram of the electronic architecture of the portable computer of FIG. 1.

FIG. 4 is a block diagram of the bottom printed wiring board 168 of the portable computer 100 (shown in FIG. 2). The battery system (not shown) of portable computer 100 is Lithium Ion and has internal controllers which monitor the capacity of the battery. These controllers use a 4.19 Mhz crystal internal to the battery.

Portable computer 100 also has an internal sound chip 334 which can be used to generate or record music and/or sound effects. The sound chip 334 is feed by internal speakers, an external speaker connection, and internal and external microphones. In addition, a zoom video port feeds into a codec chip 332 which is connected to the sound chip set 334. The codec chip 332 is a digital to analog converter.

The modem chip set 342 is connected to a DAA daughter card 336, a modem codec 340, and a voice codec 346 which also connects to the microphones and speakers. The DAA daughter card 336 is an adapter that allows the modem 342 to adapt to many different types of telecommunications around the world without modification to the modem 342 itself.

The super I/O (input/output) chip set 344 is connected to a set of buffers 338, a floppy disk drive, an IDE hard disk drive, and serial and parallel ports. In addition, a second serial port is connected to a Serial Infrared (SIR) device. This SIR device has an interface chip which uses a 3.6864 Mhz oscillator. The SIR port can be used to communicate serial data to other computers or peripherals equipped to either receive or transmit SIR data.

The programmable logic device (PLD) 348 controls many proprietary functions of the computer. For example, the PLD 348 controls the IDE interface to the media bay module which may include a CD-ROM player, an additional hard disk or other peripherals devices. In addition, if the media bay module is a floppy disk drive, the PLD 348 will route the communications to the super I/O chip 344.

The P160 350 is a board-to-board connector that connects the bottom printed wiring board to the top printed wiring board.

The sound chip set 334, the modem chip set 342, and the super I/O chip set 344 are all connected to the interrupt (IRQ), the SA (ISA address bus), and the SD (ISA data bus) lines.

Figure 5:
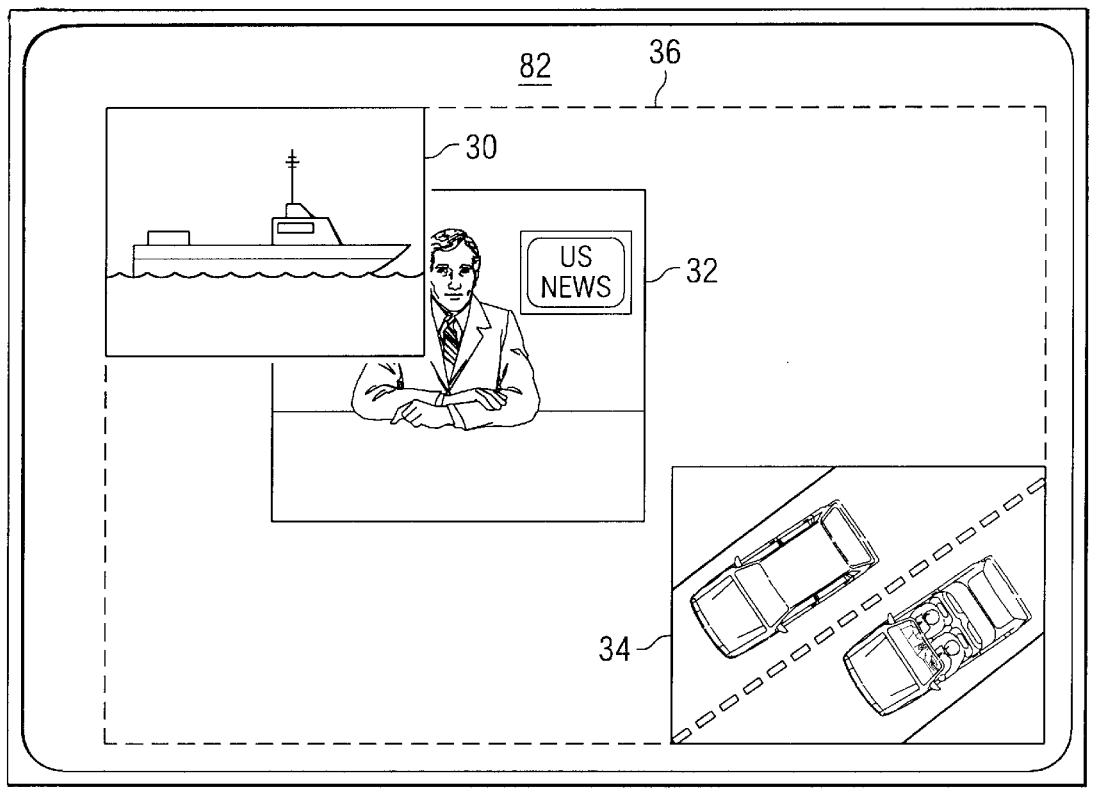
FIG. 5 is a diagram of multiple video windows-within one screen.
Figure 8:
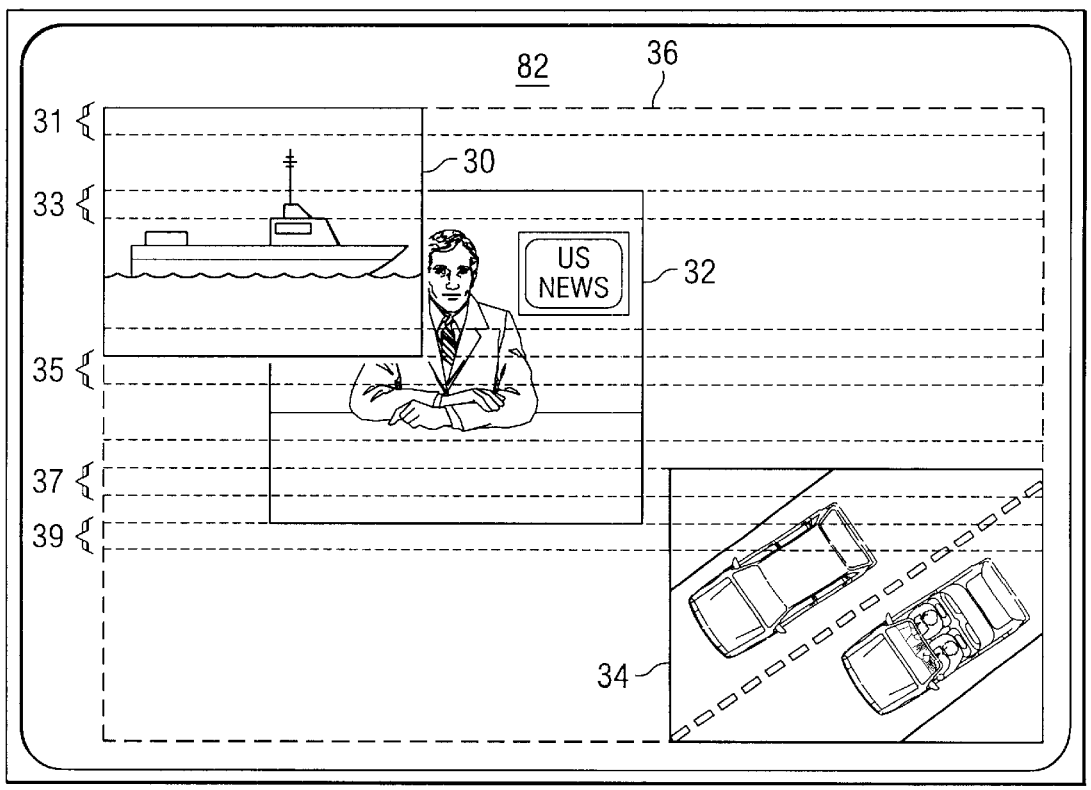
FIG. 8 shows the screen of FIG. 5, with scan lines.

FIGS. 5 and 8 are diagrams of a screen that will help explain the present invention. FIGS. 6, 7, 9–11 are alternate embodiments of FIGS. 3 and 4, but show particular details of the how the present invention works with the rest of the computer.

Now referring to FIG. 5, a diagram is shown of a screen 82 that could be processed by the present invention. The first window 30 shows a video of a sailboat in the water. The second video 32 that is in the back of the window 30, shows a news broadcast. The third window 34 shows a video of a car race. The outside borders of all three windows make a fourth window 36 that will be explained later.

Currently, computers process videos by either using a zoom video port or the microprocessor to process the videos, then display them on the screen. However, if a zoom video port is used, the zoom video bypasses the processor and inputs the video into the video port within the graphics processing chip. This releases the microprocessor from processing the video and therefore, relieves the traffic on the bus. However, in both cases, software application programs control the specifics of the device playing the video itself, and the size and positioning of each video. For example, a media player software program would control a CD-ROM playing a video. In addition, the operating system would control the priority of each window and determine which window is in the foreground, background, etc.

Figure 6:
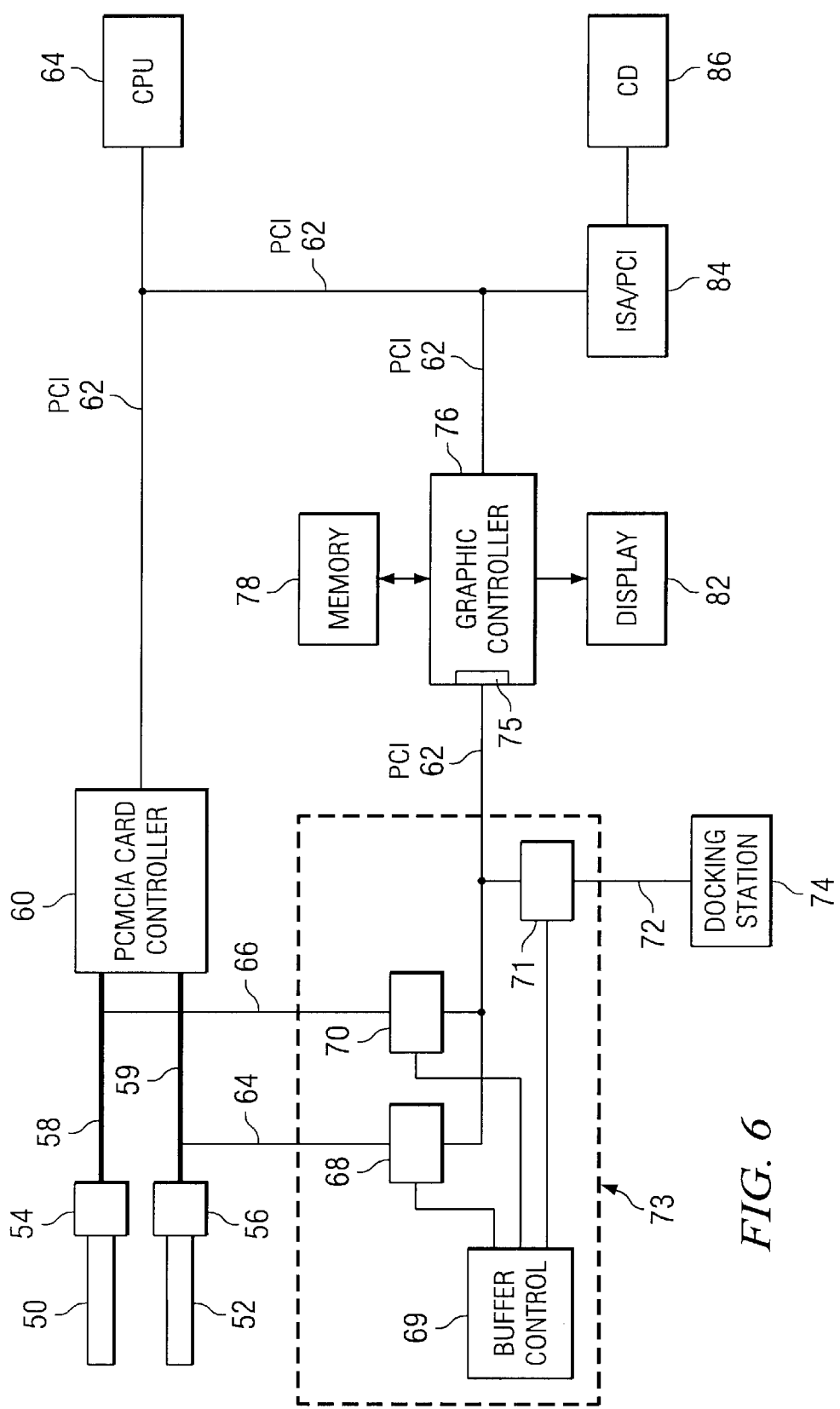
FIG. 6 is another block diagram of the electronic architecture of the portable computer.

FIG. 6 shows a block diagram of selected portions of the architecture shown in FIGS. 3 and 4, but highlight how more than one zoom video stream can be processed on a single display. The CPU microprocessor 64 is connected to the PCMCIA card controller 60, the graphic controller 76, and the ISA/PCI bridge 84 by the PCI bus 62. The ISA/PCI bridge 84 connects the CD-ROM 86 to the rest of the system.

The graphic controller 76 is also connected to the graphics memory 78 and the LCD screen 82. The PCMCIA card controller 60 is connected to the PCMCIA card slots 54, 56 by communications lines 58, 56. The PCMCIA cards 50, 52 are inserted into the PCMCIA card slots 54, 56. The PCMCIA cards 50, 52 enable several types of devices that feed a video stream into the computer. For example, a MPEG decoder, a video conference card, or a video capture card could be installed and used to display different video streams on the display. The PCMCIA communications lines 58, 56 are also connected to the PCI bus 62 and the graphics controller 76 by zoom video lines 64, 66. The communications lines 58, 60 are implemented with 32 or 16 bit busses.

However, since video port 75 can only process one video stream at a time, a control system 69 controls buffers 68, 70 to alternate the video streams that come from the two PCMCIA communications lines 64, 66. In addition, a docking station 74 (or other peripheral device) may be connected to the graphics controller 76 by communications line 72 and would have to alternate with the other two video streams by use of its buffer 71 and the control system 69.

However, this buffering scheme 73 allows only one video stream to be active at one time, and therefore, either the other video streams are blank or freeze on the last updated frame. The present invention would be used to replace this buffering scheme 73 and would also be connected to the rest of the system by PCI bus 62.

Figure 7:
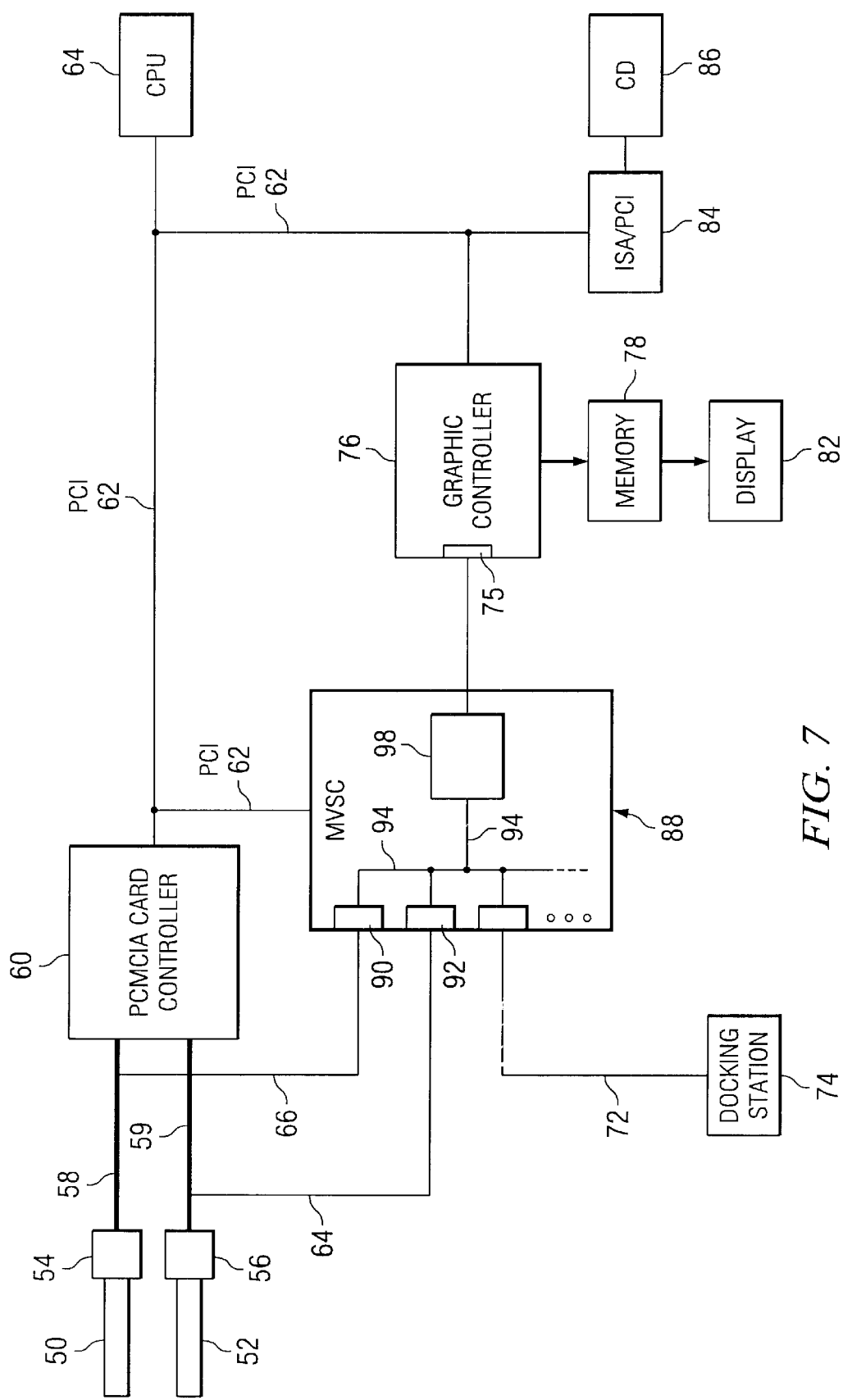
FIG. 7 is another block diagram of the electronic architecture of the portable computer with present invention.

FIG. 7 shows a diagram similar to that of FIG. 6 with the CPU 64, the graphic controller 76, graphics memory 78, display 78, ISA/PCI bridge 84, CD-ROM 86 and PCMCIA card controller 60. However, the system of the present invention comprises a video multiplexer, hereinafter referred to as multi-video stream controller (MVSC) 88. In this embodiment, zoom video lines 64 and 66 feed into the MVSC 88 by ports 90, 92. The ports 90, 92 act as buffers as well as digital-to-analog converters. The ports 90, 92 are connected by communications bus 94 to the device 98 that converts them from many video streams into one analog scan-line multiplexed video stream. Device 98 would merge the video streams into one display window. The device 98 would get window position and size information from the CPU 64 and the software applications controlling each video input. The device 98 would then format the video streams from top to bottom by scan lines.

Using the same screen shown in FIG. 5, FIG. 8 shows the three windows divided into scan lines (however, the scan lines are exagerated for clarity purposes). The device 98 would format a video window using the window 36 and all the information in it gathered from the three video inputs 30, 32, 34. The device 98 would first process the top line 31 of window 30, then leave a special code for the rest of the line to state that the rest of window 36 has no video information. The device repeats this process until it reached the top line 33 of window 32. It then formats the video information to identify the information of window 30, and the information of exposed window 32 (ignoring the portion of window 32 covered by the window 30) and then leave the rest of that line blank. The device repeats this process until it process the bottom line of window 30. It then reports that that the next line 35 has video window 36 blank until window 32, then blank again after window 32. However, when the device reaches the line 37 where window 32 and window 34 both have information, it formats the information to identify that that window 36 is blank until window 32 and then blank again until window 34. Device 98 then repeats the same process until the bottom of window 32 is processed. The next line 39 is then identified as having the beginning of window 36 blank until window 34, and repeats the process until the bottom of window 34 is reached. This one video stream is then fed line by line into the video port 75 in the graphics controller 76. However, since the video streams can be updated at a faster rate than the device 98 can format the entire window 36, a memory device is also needed to store the video information until it can be formatted into the window 36.

This formatting of device 98 allows multiple video streams to be processed at the same time by the graphics controller 76 and video port 75. The video port 75 and graphics controller would then get information from the software applications to format the rest of the display screen 82. The rest of the display screen 82 could include the operating system or any other software program running on the computer. The graphics controller would then gather the priority, background and foreground information of the display screen 82 and then display the display screen 82 accordingly. In addition, the blank portions of the video window 36 will be overwritten as if it did not exist.

Figure 9:
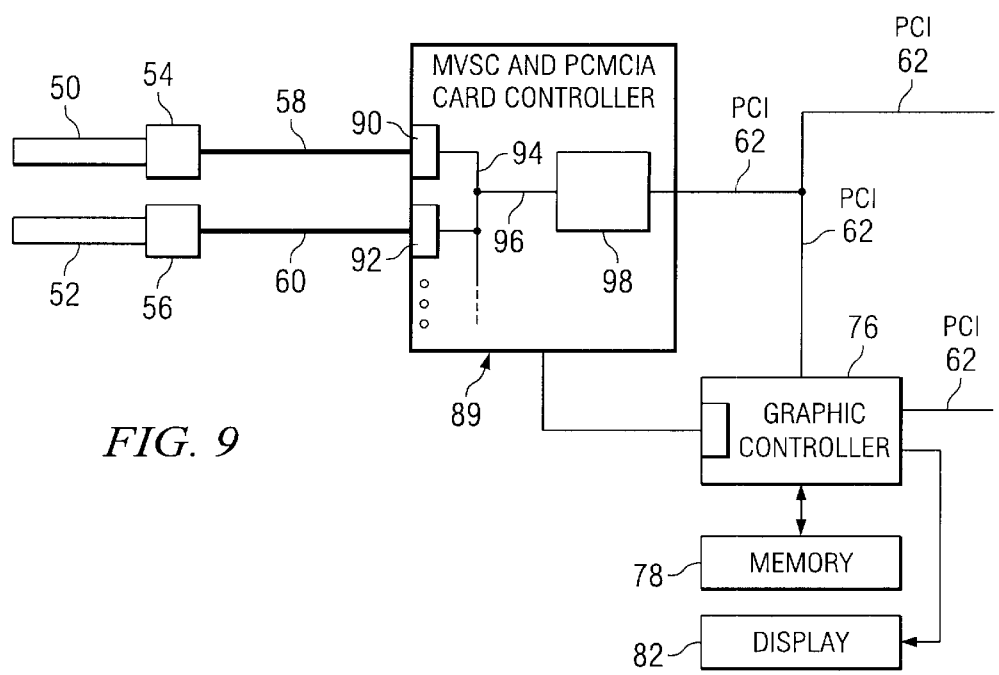
FIG. 9 is another embodiment of the present invention.

FIG. 9 shows an alternate embodiment of the MVSC 88 shown in FIG. 7. This embodiment incorporates the PCMCIA card slots 54, 56 into the MVSC 89 and all the functions of the PCMCIA card controller. This combination would lessen the pin count by incorporating both chips, and eliminate separate zoom video ports from the PCMCIA card controller to the MVSC as shown in FIG. 7. However, the MVSC would still be connected to the graphics controller 76 by the PCI bus 62 and function the similar to the MVSC 88 shown in FIG. 7 with buffer and digital-to-analog converters 90, 92 communications line 94 and device 98.

Figure 10:
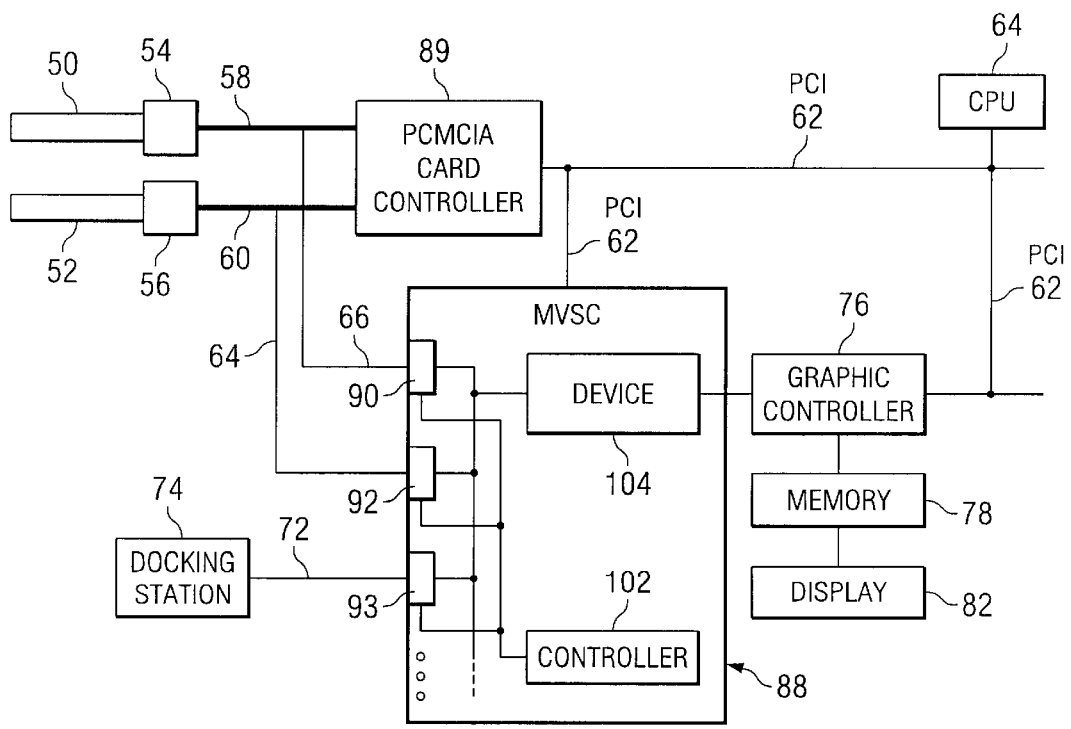
FIG. 10 is yet another embodiment of the present invention.

FIG. 10 shows another alternate embodiment of the MVSC 88. This embodiment shows zoom video ports 64, 66, 72 feed into buffers 90, 92, 93 respectively. However, no digital-to-analog converters are needed since controller 102 controls the video streams by controlling the buffers 90, 92, 93 by sampling at a higher rate than the highest rate of the video streams. Device 104 would then merge the video streams into one video window similar to the function of the device 98 shown and described in FIG. 7.

Figure 11:
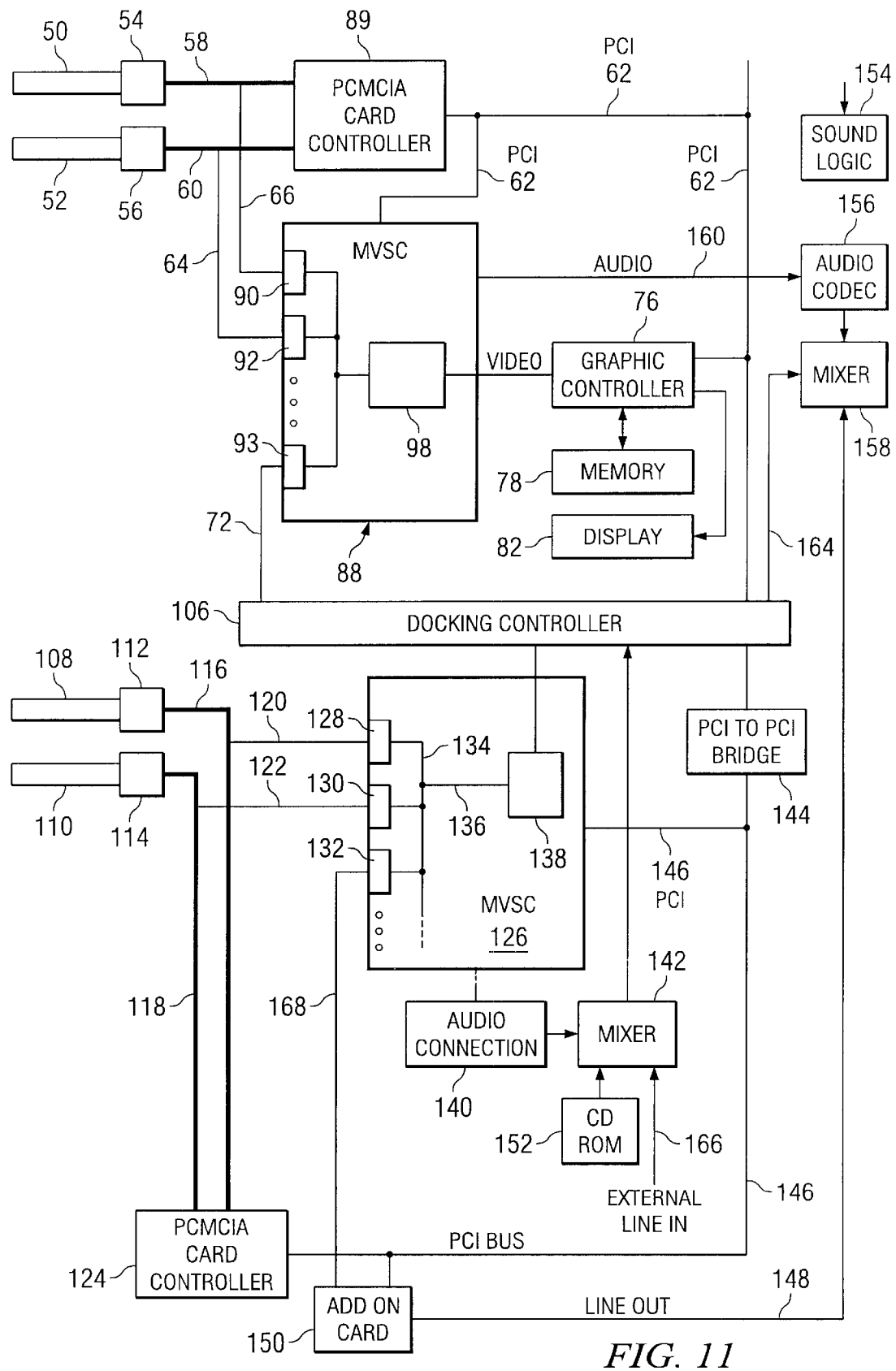
FIG. 11 is yet another embodiment of the present invention.

FIG. 11 is a diagram similar to that of FIG. 7, but shows more detail of the docking station 74. In addition to the items listed in FIG. 7, FIG. 11 shows a sound logic block 154, an audio codec block 156, a mixer 158. The sound logic block 154 is connected to the mixer by line 162. Moreover, the audio codec 156 is connected to the mixer 158 also.

The docking station 74 shown in FIG. 7, is replaced by the rest of the diagram shown in FIG. 10. The docking controller 106 is connected to the computer by zoom video port 72, line 164 which connects to the mixer 158 and PCI bus 62. PCMCIA cards 108, 110 can be inserted into PCMCIA card slots 112, 114. Card slots 112, 114 are in turn connected to the PCMCIA card controller 124 and connect to zoom video ports 120, 122. Zoom video ports 120, 122 feeds into MVSC 126 by buffers and digital-to-analog converters 128, 130, which in turn connect to communications line 134. Moreover, buffer and digital-to-analog converter 132 is feed by add-on card 150. Add-on card 150 is also connected by line out 148 to the mixer 158 in the computer. The video signals then merge into line 136 and feed into device 138. Device 138 formats the video signals into one video window similar to the function of device 98 shown in FIG. 7. The audio connection 140 is also connected to the MVSC 126 and mixer 142. Mixer 142 is also connected to the CD-ROM 152, and an external line in 166. (However, CD-ROM 152 could also implement a zoom video port connection for the MVSC 126.)

PCI-to-PCI bridge 144 connects the PCI bus 62 from the computer to the PCI bus 146 in the docking station and connects to the MVSC 126, the add-on card 150 and the PCMCIA card controller 124.

In this embodiment, docking station MVSC 126 works similarly to that of MVSC 88, but the output of MVSC 126 is feed into the MVSC 88 by zoom video port 72. Therefore, the MVSC 88 in the computer would then format the video stream from the docking station as if it was one video window similarly formatted to its own output to the graphics controller 76.

This system enables compressed video signals as well as decompressed signals to be received and displayed by the computer seamlessly. In addition, even though the example used three video windows, the present invention could process more or less windows with the same approach.

While this invention has been described with reference to illustrative embodiments, this-description is not intended to be construed in a limiting sense. In addition, various modifications and combinations of the illustrative embodiments, as well as other embodiments of the invention, will be apparent to persons skilled in the art upon reference to the description. Words of inclusion are to be interpreted as nonexhaustive in considering the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for processing multiple video streams, comprising:
    a central processing device;
    a communications bus coupling an input device, an output device and a graphics controller to said central processing device; and
    a video multiplexer having multiple video inputs, at least one of which is coupled to receive a video stream from a peripheral device, and a single video output, said single video output coupled to an input of said graphics controller.

2. The system of claim 1, wherein said multiple video inputs are coupled to receive multiple video streams.

3. The system of claim 2, wherein said video multiplexer converts said multiple video streams into one multiplexed video stream which is output to said graphics controller.

4. The system of claim 3, wherein said multiplexed video stream is formatted into one display window.

5. The system of claim 4, wherein said multiplexed video stream is an analog scan-line multiplexed video stream.

6. The system of claim 1, wherein said input of said graphics controller is a video port.

7. The system of claim 6, wherein said video port can only process one video stream at a time.

8. The system of claim 1, wherein said input of said graphics controller is the one and only video input to the graphics controller.

9. The system of claim 1, wherein said multiple video inputs act as buffers.

10. The system of claim 1, wherein said multiple video inputs are digital-to-analog converters.

11. The system of claim 1, wherein said multiple video inputs are digital-to-analog converters and act as buffers.

12. The system of claim 1, wherein said video multiplexer is further coupled to said communications bus.

13. The system of claim 12, wherein said video multiplexer obtains window position and size information from the central processing device and from software application controlling each video input.

14. The system of claim 1, wherein said system is a computer.

15. A computer for processing multiple video streams, comprising:
    a central processing device;
    a communications bus coupling an input device, an output device and a graphics controller to said central processing device;
    a video multiplexer having multiple video inputs and a single video output, said single video output coupled to an input of said graphics controller; and
    a docking station coupled to said computer, one of said multiple video inputs coupled to receive a video stream from said docking station.

16. A system for processing multiple video streams, comprising:
    a computer, said computer comprising:
        a central processing device;
        a communications bus coupling an input device, an output device and a graphics controller to said central processing device; and
        a video multiplexer having multiple video inputs and a single video output, said single video output coupled to an input of said graphics controller; and
    a docking station coupled to said computer, said docking station comprising:
        an input device; and
        a video multiplexer having multiple video inputs and a single video output coupled to one of said multiple video inputs of said computer's video multiplexer.

* * * * *